Figure 1:
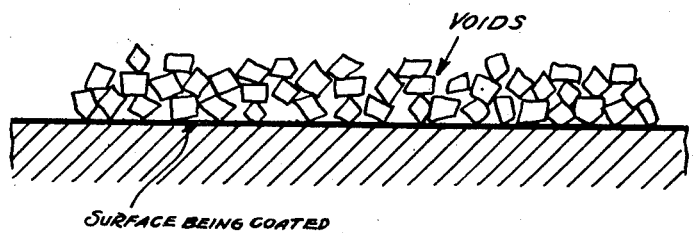

March 11, 1947. G. C. COX 2,417,064
RUST-INHIBITING COATING COMPOSITION
Filed March 15, 1944

INVENTOR
GEORGE C. COX
William D. Hall
Attorney

Patented Mar. 11, 1947

2,417,064

UNITED STATES PATENT OFFICE 2,417,064

RUST-INHIBITING COATING COMPOSITION

George Chandler Cox, Charleston, W. Va.

Application March 15, 1944, Serial No. 526,579

4 Claims. (Cl. 106—14)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to improved coatings for the protection of metals or alloys which are exposed to corrosive conditions, also to improved coatings for the insulation of electrical wires, metal surfaces and metal foil for electrical condenser dielectrics. One of the principal objects of the invention is to provide a thin corrosion resisting film or coating which will protect metal surfaces, and particularly ferrous alloys, from corrosion in the atmosphere or when partially or completely submerged in saline or other waters. When in contact with a ferrous alloy this coating will inhibit corrosion of the coated surface by producing a non-corrosive "atmosphere" at the surface of the metal. Such coatings have also been found to have excellent dielectric and electrically insulating properties which will withstand temperatures materially higher than the char point of resin and other organic coatings.

In accordance with the present invention a film of not to exceed a few thousandths of an inch is applied by the most suitable means to the metal surface to be treated. Such a film is comparable in thinness to a paint or resin film. For example, the inner surface of a ship's ballast tank which holds sea water at intervals, may be protected from undesirable corrosion by an occasional coating of its surfaces with a film consisting predominantly of simultaneously precipitated hydroxides of magnesium and calcium in which the weight ratio of magnesium hydroxide to calcium hydroxide is within the range limits of 0.3 to 3.0 approximately, although the preferred ratio is within the range of 0.6 to 1.5 approximately. Insolubles as the $R_2O_3$ oxides, low soluble silicates and other inert materials may be used as a "filler" in specific instances where it is desired to use a minimum of the actual coating composition.

The $R_2O_3$ oxides referred to in the previous paragraph are intended to include the oxides of iron and aluminum, namely $Fe_2O_3$ and $Al_2O_3$. These oxides may enter the coating composition either by precipitation from impure mother liquor, by being suspended in fine particles in the mother liquor, or they could be deliberately added as an inert filler. In any of the aforementioned conditions the $R_2O_3$ oxide particles will act merely as a filler in exactly the same manner that sand acts as a filler in Portland cement mortar.

When the magnesium and calcium constituents are simultaneously precipitated within the above defined weight ratios from a solution containing calcium and magnesium ions (a solution containing calcium and magnesium salts) a microcrystalline dispersion of calcium rich constituent is deposited in a colloidal or gelatinous matrix consisting essentially of magnesium hydroxide.

As far as can be determined, the coating of the invention comprises substantially uniformly dispersed microscopic crystals and crysal aggregates which are compounds of calcium in the substantially pure form. These crystals are embedded in the amorphous matrix, which fills the microscopic voids around the crystals so that the porosity is reduced to an extremely low value. As far as can be determined the magnesium content of this coating composition is contained in the matrix in the form of various low soluble magnesium compounds such as the hydroxide, oxides, oxy-chloride or basic carbonate, etc. It appears that this matrix is an amorphous or colloidal mixture containing the magnesium compounds with or without some of the calcium constituents.

In other words this heterogeneous coating composition may be defined as consisting of a microcrystalline suspension of calcium-rich compounds dispersed in a gelatinous or colloidal mixture consisting essentially of magnesium compounds, the overall chemical analysis of which is within the limits of 7% to 28% magnesium equivalent and 10% to 40% calcium equivalent.

It is observed that the function of the matrix is twofold; (a) it fills the voids surrounding the microscopic calcium compound crystals; and (b) it cements the crystals firmly to each other and to the metal surface to be protected. Therefore, the matrix is an inorganic gelatinous or colloidal type of bonding agent, consisting substantially of low soluble compounds of magnesium.

The chief function of the microscopic crystal dispersion is that of preventing the formation of shrinkage cracks in the magnesium rich matrix. Because of this dispersion of microscopic crystals throughout the matrix the tensile force in the matrix (due to shrinkage) is reduced to a value below that required to rupture the matrix, therefore shrinkage cracks are prevented. The result is a continuous unbroken surface without pores or cracks.

Another function of the crystal dispersion appears to be that of increasing the strength and hardness of the coating. However, the ductility appears to depend upon the amorphous or colloidal constituent.

When such a coating composition, consisting essentially of microscopic crystals and crystal aggregates of low soluble calcium compounds dispersed in a colloidal mixture of magnesium compounds, is applied as a thin film or coating to a mild steel surface and then exposed to sea water or similar saline solution, a coating with an excess of calcium constituent can be made to impart an effective pH value greater than 7 and less than 10 to any equivalent solubility products at the coating-metal interface, and thereby produce a non-corrosive "atmosphere" adjacent to the metal surface.

The coating can be applied to a metal surface as a paint-like film during the chemical or electrochemical precipitation or after the precipitation by spraying, brushing or dipping, provided the magnesium constituent is still in the gelatinous (or colloidal) hydroxide form.

The gelatinous magnesium hydroxide acts as an adhesive for bonding the microscopic crystals together and for bonding the microscopic crystals to the metal surface. In other words, the magnesium rich constituent acts as a glue in which minute crystals are dispersed within the limits of useful coatings. The hardness appears to depend largely upon the amount of calcium rich microscopic crystals; the toughness upon the magnesium rich colloidal matrix and the density of such a low soluble coating composition is probably due to the colloidal matrix filling the voids between the microcrystalline calcium rich constituent.

When such a primary film or coating composition, comprising a mixture of freshly precipitated magnesium and calcium hydroxides, (capable of furnishing a final coating having the characteristics and within the limits hereinafter described) is applied in a thin layer to a rustable steel surface such as the outside of a ship or the inside of a tank or compartment, corrosion of such surface will be inhibited for an appreciable period of time. However, for a short time after its application to the metal surface, the coating is soft, gelatinous and somewhat soluble so that at first care must be exercised to prevent it from being rubbed off or washed away when it is in contact with a fluid such as sea water or the like, but within an interval of a few days such a primary coating will take a "water or air set," becoming hard, dense and difficultly soluble.

This property of setting into a hard, difficultly soluble composition of matter indicates that, in addition to any dehydration, the absorption of carbon dioxide, chloride or both has taken place, such substances having been obtained from the circumjacent water or air. Approximations of such absorption reactions are believed to be substantially as follows:

(1)  $2Mg(OH)_2 + CO_2 \rightarrow (MgOH)_2CO_3 \cdot H_2O$
(2)  $Mg(OH)_2 + MgCl_2 \rightarrow (Mg)_a \cdot (OH)_b \cdot (Cl)_c$
(3)  $Ca(OH)_2 + CO_2 \rightarrow CaCO_3 + H_2O$ In reactions 1 and 2 above, the magnesium components are colloidal and after the reaction, the end products may be colloidal but are usually amorphous.

These hydrated carbonate complexes, oxychloride complexes and hydroxides of magnesium have comparatively low solubility, as has calcium carbonate which is generally formed during the setting process.

Many chemical analyses of effective coatings of this kind (after such coating has partially or completely set) indicate that though the equivalents of the essential components may vary throughout a substantial range, nevertheless such range has definite limits as indicated in the following table where percentages are by weight upon a dry basis, the term "dry basis" designating the residue after the removal of water to constant weight of 105 C.

| | Actual range | Preferred range |
|---|---|---|
| | Per cent | Per cent |
| Magnesium equivalent | 7 to 23 | 10 to 20 |
| Calcium equivalent | 10 to 40 | 15 to 30 |
| Carbon dioxide equivalent | 3 to 30 | 5 to 27 |
| Chlorine equivalent | 0 to 10 | 0.5 to 5 |

In accordance with standard analytical procedure, the above magnesium and calcium values may be expressed in terms of the equivalents of their oxides. Within the above limits, variations in the individual components have given useful coatings. However, in general, when the calcium equivalent is high, the carbon dioxide content is high, and the magnesium and chlorine equivalents are lowered.

For purposes of illustration typical examples of poor and useful corrosion inhibiting coatings will be given.

1. A test panel was coated with a freshly precipitated layer of calcium hydroxide. After drying, this coating was examined under the microscope and was found to consist of a mass of separate crystals and agglomerates each of which was surrounded by microscopic voids. Even after such a coating had reacted with carbon dioxide at atmospheric concentrations or greater, no improvement in the structure was noted. As would be expected, such a highly porous crystalline type of coating was poorly bonded to the metal surface, and could easily be removed by rubbing or washing. The various "white wash," mortar and carbonate coatings are of this type. Figure 1 shows the typical porous structure, the crystals of which appear to be irregularly rhomboidal in form. This coating cannot be considered as a corrosion inhibiting coating, as the various tests on polished steel panels have shown that corrosion of the steel surface under this type of coating will begin after the first dip into a brine solution.

Figure 2:
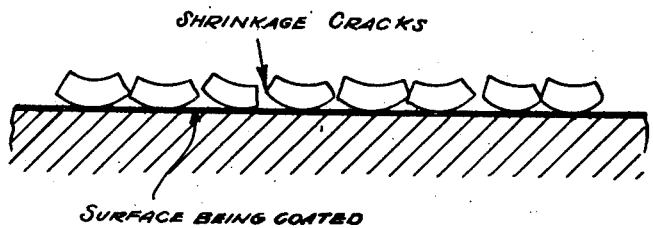

2. A test panel was coated with a freshly precipitated layer of magnesium hydroxide. When completely dehydrated at room temperature, the entire surface became covered with microscopic shrinkage cracks and the resulting minute flakes of amorphous magnesium hydroxide could be easily removed by rubbing or washing. Figure 2 illustrates this situation. Similar to the previously discussed type of coating, this dehydrated layer has almost no corrosion retarding usefulness.

Figure 3:
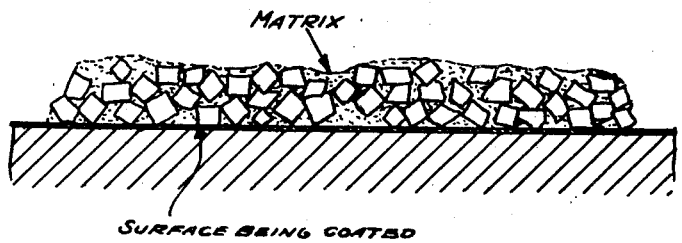

3. Various test panels were coated with different mixtures containing varying quantities of freshly precipitated magnesium and calcium hydroxides. The resulting coatings, when within the approximate chemical composition limits as previously discussed, have rust inhibiting properties. A coating of this composition is non-porous, hard and firmly bonded to the metal surface. Such a coating has good corrosion inhibiting properties under all usual corrosive conditions, except acid solutions having a value of less than about 5.0 on the pH scale. Figure 3 illustrates the microcrystalline structure of such a coating commonly observed.

4. As compared with the effects obtained by the use of applicant's coating material, similar tests were made using Portland cement as the coating. When clean, mild steel test panels were coated with a thin slurry of Portland cement, fairly good union of the material to the steel was obtained, but the resulting coatings were full of microscopic pores and voids. A Portland cement coating of such thinness (to compare with applicant's coatings) has poor corrosion inhibiting properties under all corrosive conditions and therefore is of no practical value in comparison to the corrosion inhibiting properties of applicant's coatings.

Applicant's coating composition is of extremely low solubility both in sea water and in petroleum products and thus it fills a definite requirement of inhibiting the corrosion of tank ship compartments which are alternately filled with sea water and with a petroleum product. This definite need in the petroleum transporation industry exists due to the fact that the bonding agents of water-resistant paints are soluble in petroleum products and due to the fact that the new resin base paints are impractical to apply because of the excessive heat required to convert the resin into an insoluble product.

Moreover, applicant's composition can withstand excessive temperatures similar to asbestos and because of the shortage of asbestos during the present emergency, it meets the requirement of an asbestos substitute for the insulation of electric wires, cables, rheostats and machinery which must withstand excessive temperatures. In certain instances it may be used as a mica substitute, especially in low voltage condensers.

Applicant believes that a gelatinous compound of the alkaline earth group is a practical solution to the problem of forming a highly insoluble matrix for the dispersion of microcrystalline compounds also of the alkaline-earth group. In other words, (a) an amorphous matrix that can be formed from a gelatinous or colloidal alkaline-earth group compound, and (b) microscopic crystals of an alkaline earth group compound formed by precipitation, uniformly dispersed throughout the matrix in order to prevent shrinkage cracks in the matrix.

While a preferred embodiment of the invention has herein been disclosed by way of example, it is to be understood that the invention is not limited with respect to the precise mode of applying the primary coating or of causing such primary coating to set and become hard and difficultly soluble, but is to be broadly inclusive of any and all equivalents both of procedure and constituent substances such as fall within the scope of the appended claims.

This application is a continuation-in-part of my co-pending application Serial Number 393,119 on "Coating for ship bottoms and other marine structures," filed May 12, 1941.

I claim:

1. A rust inhibiting coating composition comprising essentially a microcrystalline dispersion of low-soluble calcium compounds the crystals of which are comparatively uniformly dispersed in an amorphous matrix consisting essentially of magnesium compounds, said coating composition being designed for direct application as a thin, paint-like film to a mild steel surface, said coating composition being soft and gelatinous when first applied to the steel surface, but gradually becoming hard, dense and firmly adherent, the coating composition as applied consisting predominantly of the freshly simultaneously precipitated hydroxides of magnesium and calcium, the ratio of magnesium hydroxide to calcium hydroxide being within a range whose limits are 0.3 and 3.0 approximately, the balance of the coating composition, when applied, consisting of inert oxides and inert inorganic insolubles, the coating after application and when externally exposed to sea water imparting an effective pH value greater than 7 and less than about 10 to any equilibrium solubility products at the interface between the coating and the metal thereby producing a non-corrosive atmosphere adjacent to said interface.

2. A corrosion inhibiting coating composition for protecting steel surfaces consisting predominantly of a self-hardening amorphous matrix of magnesium hydroxide in which a quantity of microcrystalline calcium hydroxide is uniformly dispersed, all forming a heterogeneous non-porous mass, the weight ratio of magnesium hydroxide to calcium hydroxide being within a range whose limits are 0.3 and 3.0.

3. A rust inhibiting composition for coating steel surfaces consisting predominantly of freshly precipitated hydroxides of magnesium and calcium in which the weight ratio of magnesium hydroxide to calcium hydroxide is within the limits of 0.3 to 3.0 approximately.

4. A rust inhibiting heterogeneous coating composition consisting essentially of a microcrystalline dispersion of calcium hydroxide the crystals of which are comparatively uniformly dispersed in an amorphous matrix of low soluble magnesium compounds the major portion of which is magnesium hydroxide.

GEORGE CHANDLER COX.

REFERENCES CITED

The following references are of record in the file of this patent:

UNITED STATES PATENTS

| Number | Name | Date |
| --- | --- | --- |
| 1,996,747 | Butterworth | Apr. 9, 1935 |
| 1,889,644 | La Roche | Nov. 29, 1932 |
| 757,883 | Cappon | Apr. 19, 1904 |
| 2,200,469 | Cox | May 14, 1940 |

FOREIGN PATENTS

| Number | Country | Date |
| --- | --- | --- |
| 444,931 | British | Mar. 31, 1936 |

OTHER REFERENCES

Speller, Corrosion—Causes and Prevention, 1st ed., p. 304, McGraw-Hill Book Co., N. Y., 1926. (Copy in Div. 64.)